United States Patent
Stancato et al.

(10) Patent No.: US 9,505,367 B2
(45) Date of Patent: *Nov. 29, 2016

(54) ARTICULATING SUPPORT IN A VEHICLE SEAT

(71) Applicant: Ford Global Technologies, LLC, Dearborn, MI (US)

(72) Inventors: Cortney Stancato, Novi, MI (US); Robert William McCoy, Ann Arbor, MI (US); Jaeho Cho, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,284

(22) Filed: May 21, 2015

(65) Prior Publication Data

US 2016/0288752 A1  Oct. 6, 2016

Related U.S. Application Data

(63) Continuation-in-part of application No. 14/675,367, filed on Mar. 31, 2015.

(51) Int. Cl.
| | | |
|---|---|---|
| B60R 21/00 | (2006.01) | |
| B60R 21/207 | (2006.01) | |
| B60R 22/26 | (2006.01) | |
| B60R 21/0136 | (2006.01) | |
| B60N 2/427 | (2006.01) | |
| B60R 21/01 | (2006.01) | |

(52) U.S. Cl.
CPC ....... *B60R 21/0136* (2013.01); *B60N 2/42754* (2013.01); *B60R 21/207* (2013.01); *B60R 2021/01211* (2013.01); *B60R 2021/01252* (2013.01)

(58) Field of Classification Search
CPC .. B60N 2/0296; B60N 2/0284; B60N 2/002; B60R 21/02; B60R 2021/0407; B60R 2021/0273
See application file for complete search history.

(56) References Cited

U.S. PATENT DOCUMENTS

| | | | | |
|---|---|---|---|---|
| 4,030,207 | A | * | 6/1977 | Kron ........................ G09B 9/10 434/59 |
| 6,199,900 | B1 | | 3/2001 | Zeigler |
| 6,572,137 | B2 | | 6/2003 | Bossecker et al. |
| 6,666,292 | B2 | * | 12/2003 | Takagi .............. B60R 21/01516 180/268 |
| 7,219,957 | B1 | | 5/2007 | Khouri |

(Continued)

FOREIGN PATENT DOCUMENTS

| | | |
|---|---|---|
| DE | 19735915 B4 | 6/2007 |
| EP | 2065264 A2 | 6/2009 |

(Continued)

OTHER PUBLICATIONS

Wang et al., "An Extendable and Retractable Knee Bolster", General Motors Corporation, Paper No. 323 (12 pages).

*Primary Examiner* — Mary Cheung
(74) *Attorney, Agent, or Firm* — Frank A. MacKenzie; Bejin Bieneman PLC

(57) ABSTRACT

A plurality of pads are configured to be arranged in a vehicle seat. A plurality of passive movement devices are provided to be respectively arranged behind, and to cause movement of, the plurality of pads. The passive movement devices are configured to be actuated independently of one another.

20 Claims, 17 Drawing Sheets

(56) References Cited

U.S. PATENT DOCUMENTS

| | | |
|---|---|---|
| 7,878,531 B2 | 2/2011 | Sugimoto |
| 7,963,602 B2 | 6/2011 | Spahn et al. |
| 8,702,120 B2 | 4/2014 | Kalisz et al. |
| 8,820,830 B2 | 9/2014 | Lich et al. |
| 8,844,966 B2 | 9/2014 | Feller et al. |
| 2003/0067149 A1* | 4/2003 | Gray ................ B60R 21/01516 280/735 |
| 2006/0144630 A1* | 7/2006 | Breed .................... B60N 2/002 180/273 |
| 2014/0327234 A1 | 11/2014 | Heurlin et al. |
| 2014/0361590 A1 | 12/2014 | Line et al. |

FOREIGN PATENT DOCUMENTS

| | | |
|---|---|---|
| EP | 1656283 B1 | 6/2012 |
| JP | H1071915 A | 3/1998 |
| JP | 2004237820 A | 8/2004 |
| JP | 201151526 A | 3/2011 |
| KR | 20050008911 | 1/2005 |

* cited by examiner

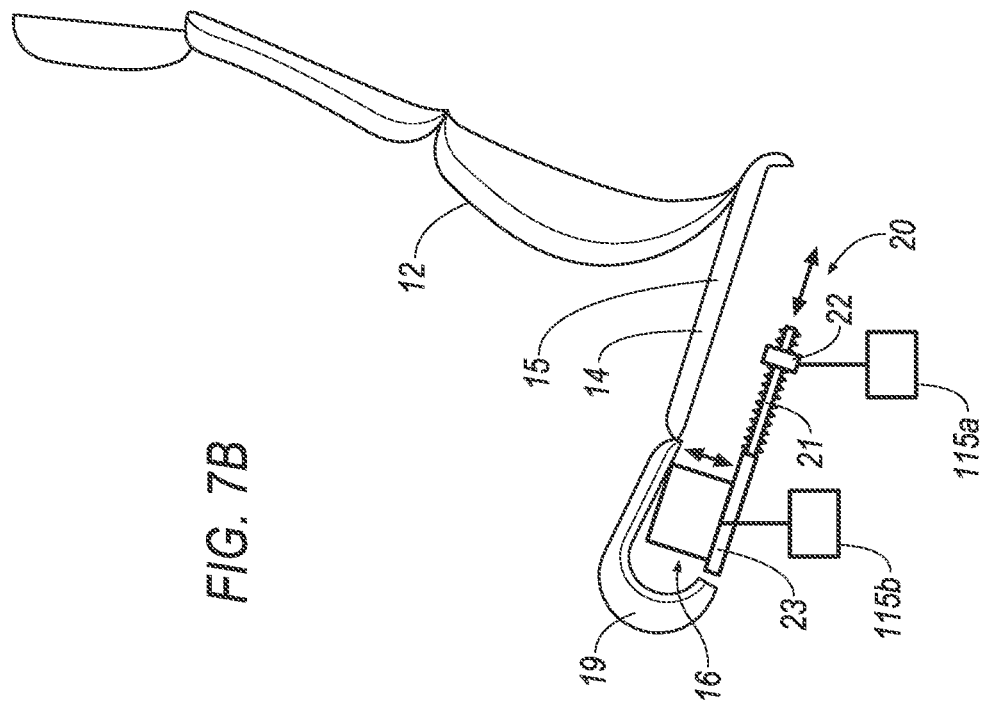
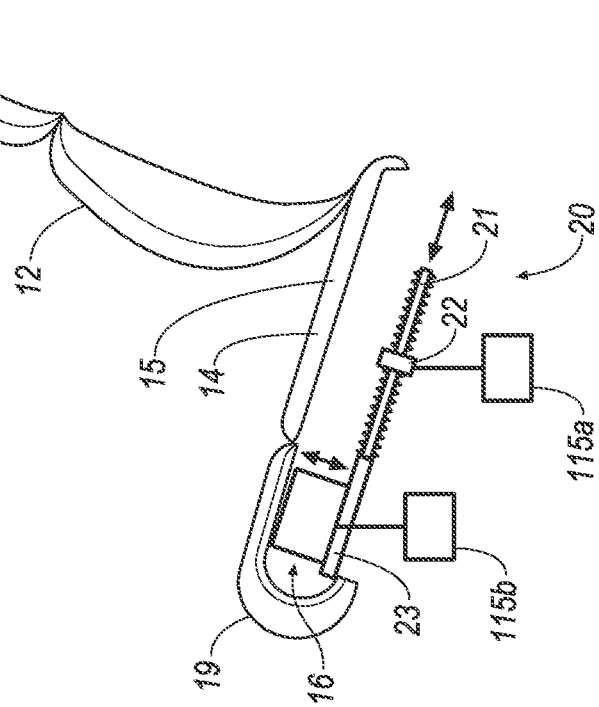

ARTICULATING SUPPORT IN A VEHICLE SEAT

CROSS REFERENCE TO RELATED APPLICATIONS

This patent application is a continuation-in-part, and claims priority to and all advantages, of U.S. patent application Ser. No. 14/675,367, filed Mar. 31, 2015, which application is hereby incorporated herein by reference in its entirety.

BACKGROUND

Vehicle safety systems are often focused on high speed crashes which can cause severe injuries and/or fatalities. However, with older and heavier occupants becoming a larger percentage of the population, focusing on lower-speed impacts is also appropriate. In fact, lower-speed impacts often result in lower extremity and upper body region injuries. Lower extremity injuries, even when non-life threatening, can have large and undesirable effects on a person's quality of life, as well as high societal costs. Therefore, improvements in vehicle safety systems protecting lower extremities as well as upper body regions would be desirable.

DRAWINGS

FIGS. 7A and 7B illustrate an embodiment of the system of FIG. 1 including articulating supports, i.e., seat pads, that can move horizontally and vertically.

DESCRIPTION

Figure 1:
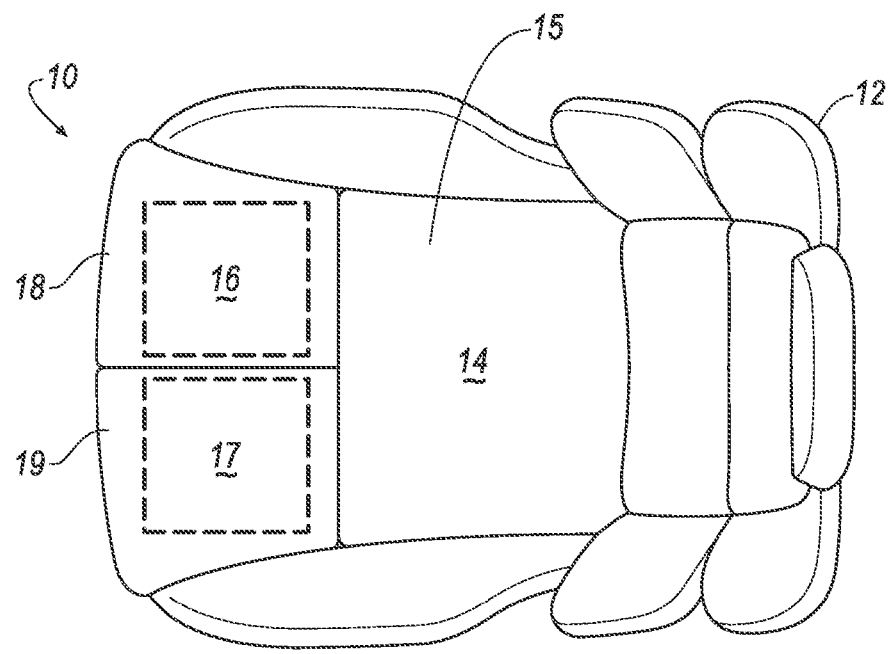
FIG. 1 is a top perspective view of an exemplary articulating support system.
Figure 2:
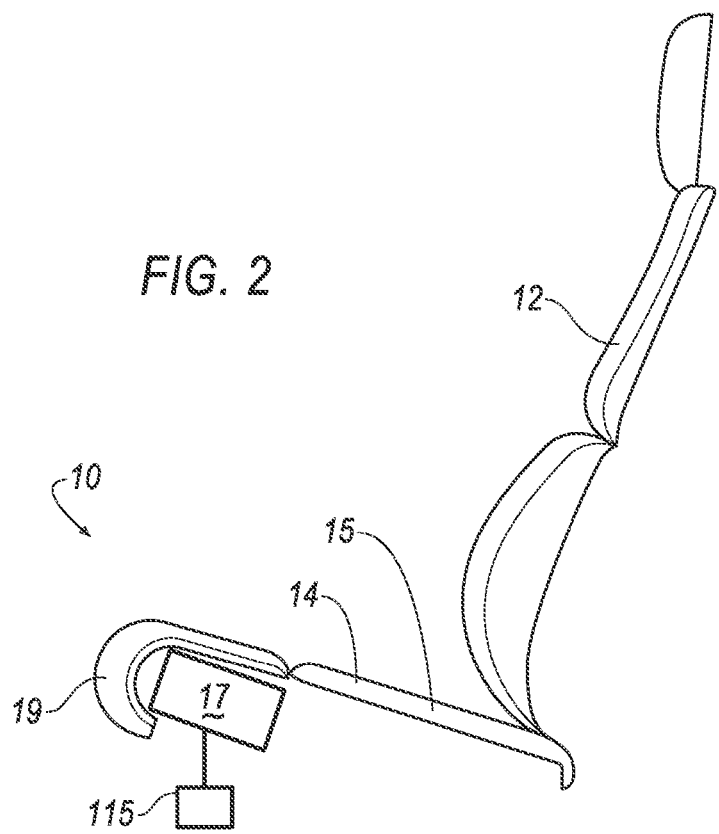
FIG. 2 is a side view of the system of FIG. 1.

With reference to FIGS. 1-6, disclosed herein is an articulating support system 10 that can be installed in a vehicle seat 12 lower portion 14, sometimes also referred to as a seat portion 14 or a horizontal portion 14, even though the portion 14 is not generally, strictly speaking, substantially horizontal. The seat portion 14 generally includes a rear portion 15 as well as first and second articulating seat pads 18, 19. Further, a system 10 in a vehicle may include multiple seats 12, and therefore, with respect to each seat in a plurality of seats in a vehicle, a plurality of respective components described herein with respect to a single vehicle seat 12.

For example, the system 10 includes, installed in a seat 12, first and second passive movement devices 16, 17, that respectively control movement, e.g., articulation, of first and second articulating seat pads 18, 19. The passive movement devices 16, 17 may include any of a variety of known components, such as a gas-inflatable airbag, an inflatable plastic bladder, or the like. For example, the seat pads 18, 19 may be moved up and down, i.e., vertically, with respect to the seat 12 and a vehicle in which the seat 12 is installed by inflation of the passive movement devices 16, 17. Actuation or deployment of the passive movement devices may be triggered by a triggering mechanism 115, such as is known, e.g., a gas inflator that is pyrotechnically actuated, etc. The system 10 may be used to absorb crash energy from the lower extremities, e.g. the legs, of a vehicle occupant.

The passive movement devices 16, 17 may be actuated independently of one another, and therefore the seat pads 18, 19 may be moved, e.g., articulated, either together or independently of one another. Further, the seat pads 18, 19 may be articulated, e.g., moved vertically, independently of a rear portion 15 of the seat 12 lower portion 14. Note that in the present context "vertically" means that the mechanisms 16, 17, move the pads 18, 19 generally up and down with respect to the horizontal portion 14. However, just as the portion 14 may deviate somewhat, e.g., by up to approximately ten or twenty degrees, from being perfectly horizontal, vertical movement of the pads 18, 19 may likewise deviate from being perfectly vertical.

Figure 3:
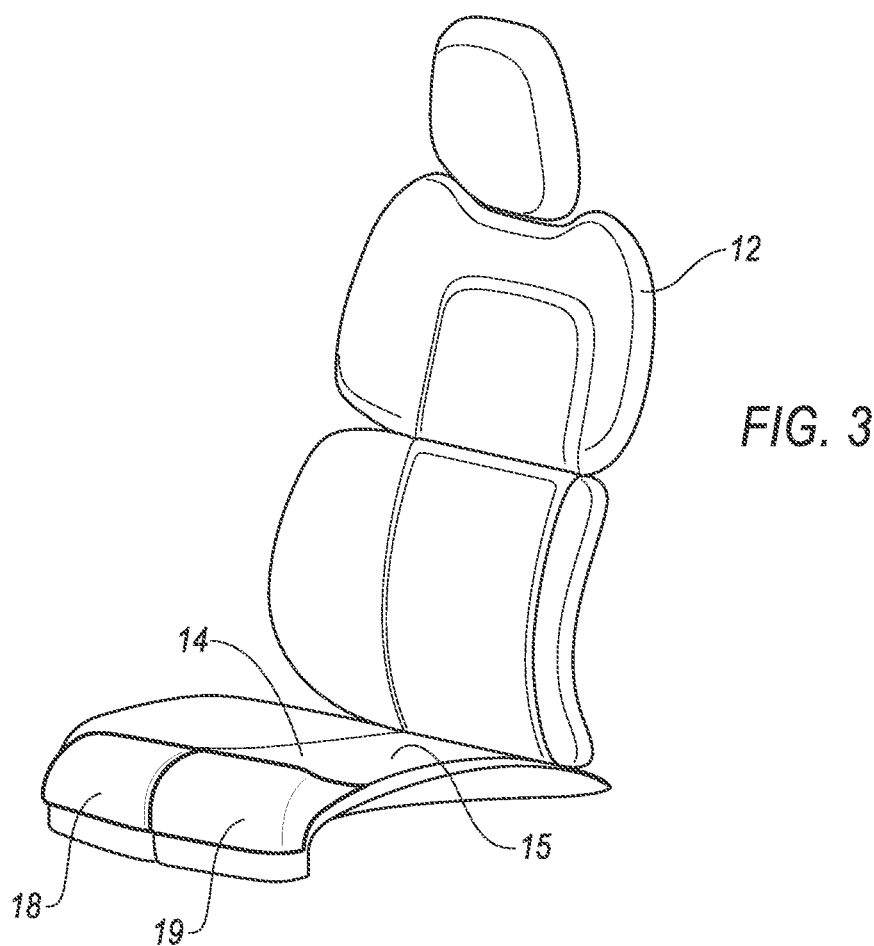
FIG. 3 is a perspective view of the system of FIG. 1 showing an undeployed state and a deployed state.
Figure 4:
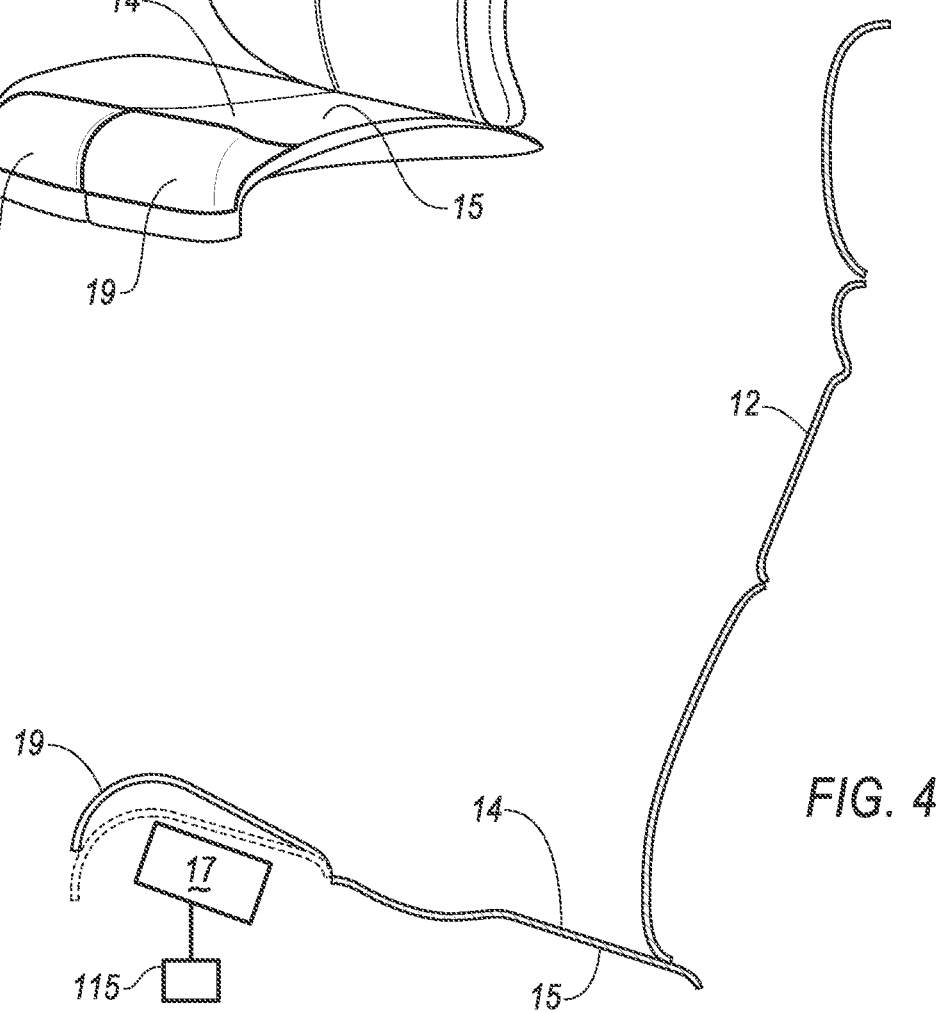
FIG. 4 is a side view of the system of FIG. 1 showing an undeployed state and undeployed state.
Figure 5:
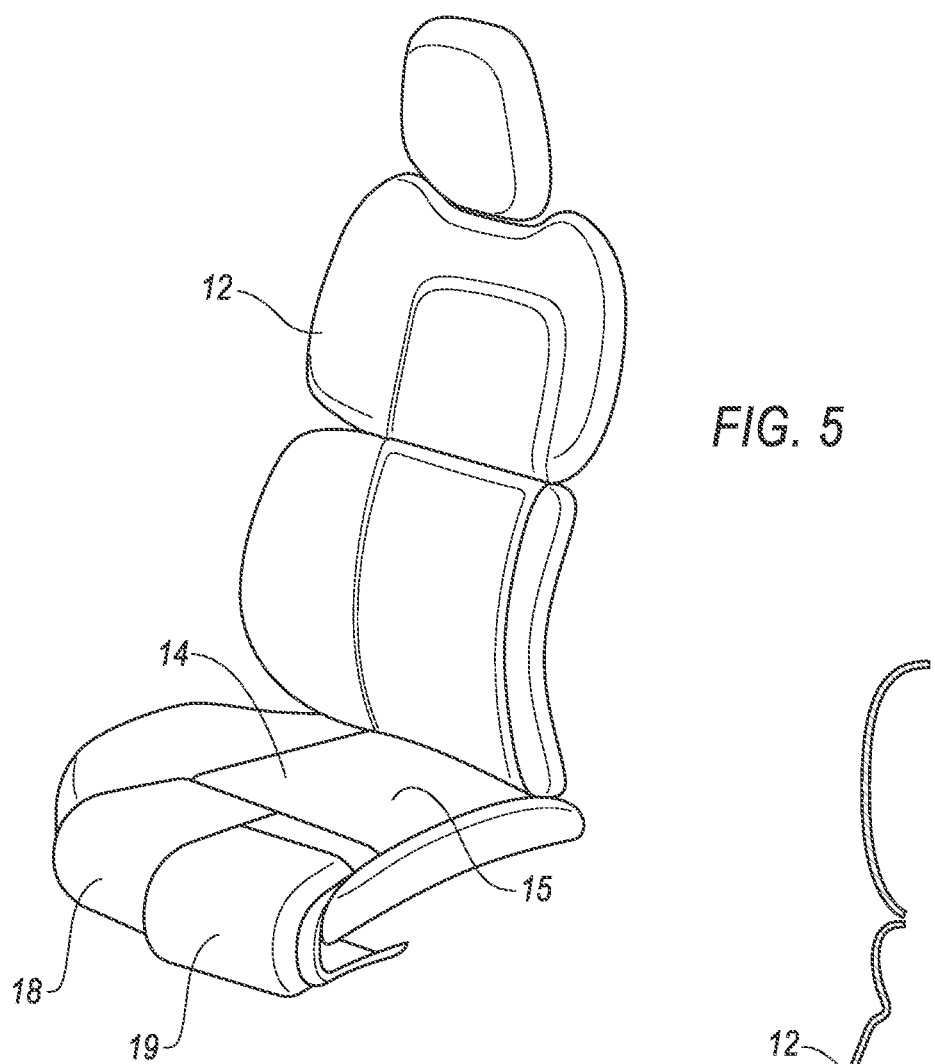
FIG. 5 is a perspective view of the system of FIG. 1 in a further example of a deployed state.
Figure 6:
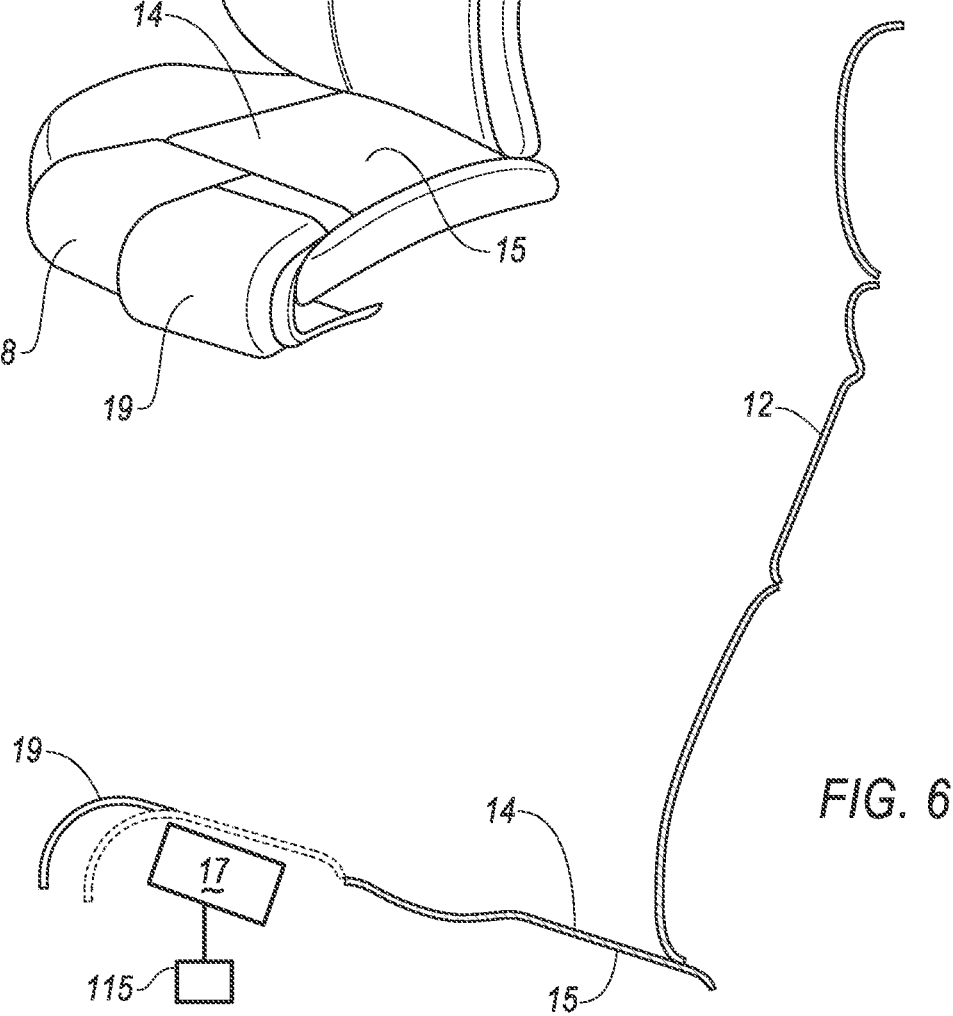
FIG. 6 is a side view of the system of FIG. 1 in the deployed state of FIG. 5.

FIGS. 3 and 4 provide an illustration that one or both of the seat pads 18, 19 may be moved in an upward direction, from an undeployed state to a deployed state, by deployment of the passive movement devices 16, 17. Further, as seen in FIGS. 5 and 6, one or both of the seat pads 18, 19 may alternatively be moved in a forward direction, from an undeployed state to a deployed state, by the passive movement devices 16, 17. That is, the seat pads 18, 19 can be restrained in a horizontal direction so that they move vertically upon deployment of the devices 16, 17 (FIGS. 3, 4), or the seat pads 18, 19 can be restrained in a vertical direction so that they move horizontally upon deployment of the devices 16, 17.

Yet further alternatively or additionally, as illustrated in FIGS. 7A-7B, one or more horizontal movement devices 20 may be arranged, e.g., via a drive mechanism 21, to move seat pads 18, 19 fore and aft, i.e., substantially in a direction along, or parallel to, a longitudinal axis of a vehicle, alternatively or additionally to vertically. That is, one or more devices 20 may be provided as a substitute for, or as a complement to, one or more devices 16, 17.

For example, each of the respective passive movement devices 16, 17 may be used as vertical movement devices, and may be paired with a horizontal movement device 20. For example, a drive mechanism 21, e.g., a piston or worm gear or the like, may be actuated by a stored energy device 22 that in turn is connected to a rigid member 23, e.g., a stiff rod, to move a pad 18 or 19. A triggering mechanism 115*a* may be used to release energy from the stored energy device 22, thereby causing movement of the horizontal drive mechanism 21, causing the member 23 to force a seat pad 18 or 19 forward. Alternatively or additionally, e.g., possible at substantially the same time, a triggering mechanism or mechanisms 115*b* may be used to deploy a device 16 and/or device 17, forcing a seat pad 18 and/or a seat pad 19 upward.

Figure 8:
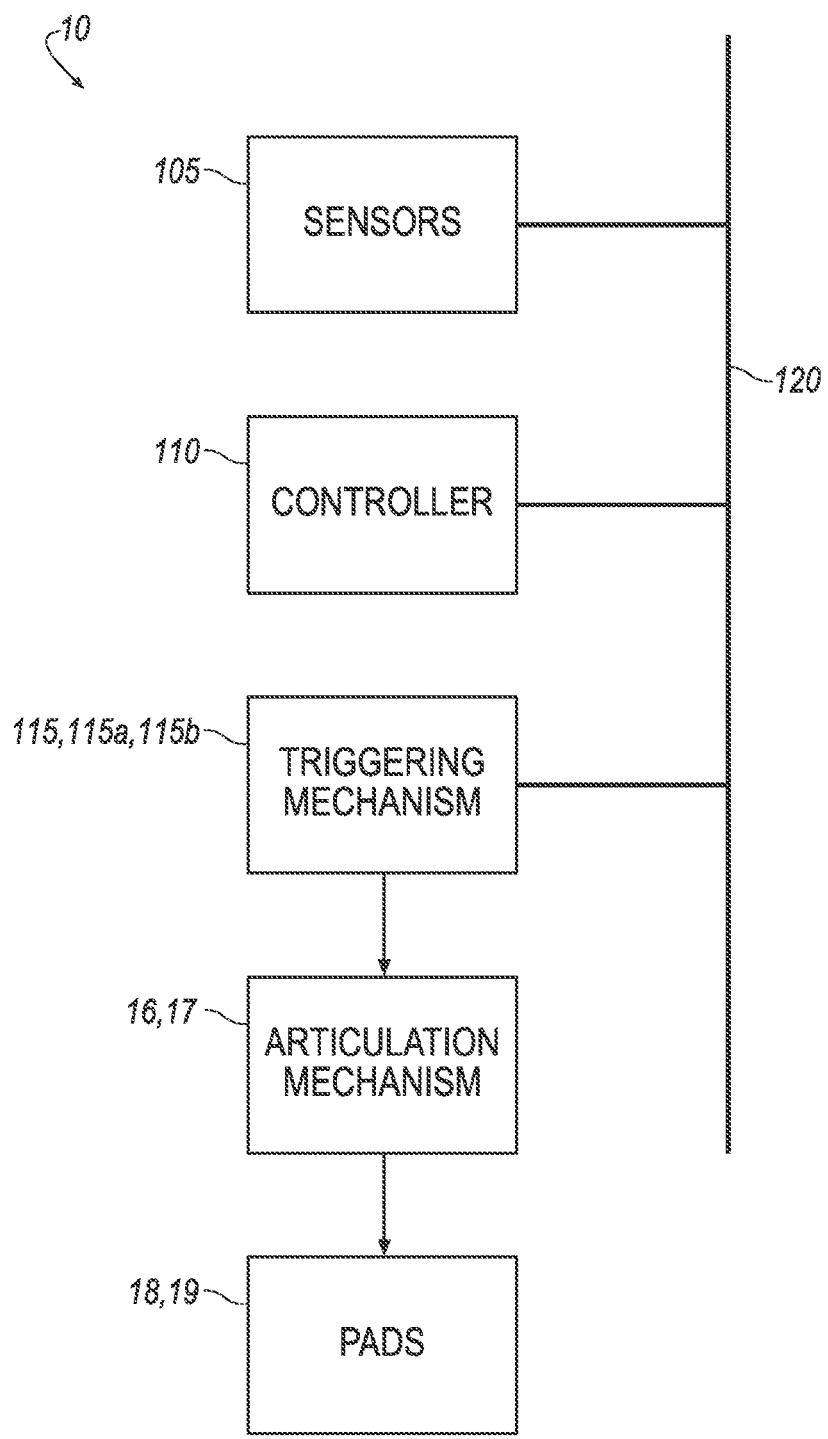
FIG. 8 is a block diagram of the articulating support system of FIG. 1.

FIG. 8 is a block diagram of the exemplary thigh support system 10 of FIG. 1. The system 10 includes impact sensors 105 such as are known for providing data to a controller 110 to determine the occurrence of an impact or likely impact. The controller 110 generally includes a processor and a memory, the memory storing instructions executable by the processor for evaluating data from sensors 105 and/or providing an instruction to the actuating mechanism 115. A vehicle communication bus 120, e.g., a controller area network (CAN) bus or the like, such as is known, may be used to provide various communications, including data from sensors 105 to the controller 110, as well as one or more instructions from the controller 110 to one or more actuating mechanisms 115 associated with respective passive movement devices 16, 17. Accordingly, the controller 110 may receive data from sensors 105 from which an occurrence or likely occurrence of an impact, e.g., a low-speed impact, may be identified. The controller 110 may then send an instruction to a actuating mechanism 115, e.g., an inflator of an airbag or bladder included in an passive movement devices 16, 17, and an actuator of a motor 20, etc., to actuate one or both passive movement devices 16, 17.

Figure 21:
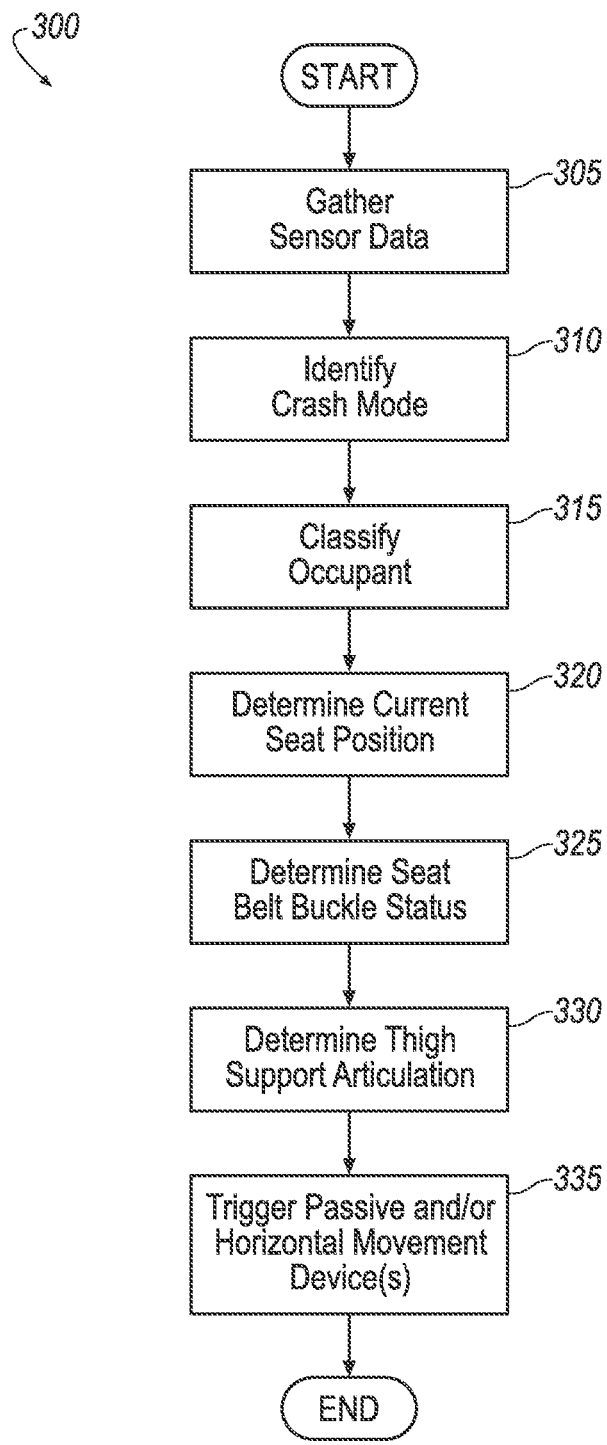
FIG. 21 illustrates an exemplary process flow for the exemplary articulating support system of FIG. 1.

FIG. 21 illustrates an exemplary process 300 that may be executed according to instructions in the controller 110. Before the process 300 begins, one or more of the pads 18, 19, may be in a default, or nominal position. As described herein, the pads 18, 19 may be moved forward, backward, up, and/or down with respect to the nominal position, e.g., as described with respect to the process 300.

The process 300 begins in a block 305, in which the controller 110 receives, e.g., via the bus 120, data from various sensors 105. For example, the controller 110 may receive data from crash sensors 105 such as accelerometers and the like, pre-crash sensors 105 such as radar sensors 105, image sensors 105, etc., as well as occupant sensor 105*s*, e.g., indicating weight, height, age, etc. of one or more vehicle occupants as is known, seat sensors indicating a seat position or positions, seat belt buckle sensor 105*s*, indicating a status of a seatbelt, e.g., buckled or unbuckled, etc.

Next, in a block 310, generally based on data from crash sensors 105 and/or pre-crash sensors 105, the controller 110 identifies a crash mode, e.g., frontal, oblique, offset, high-speed, low-speed, pedestrian, etc.

Next, in a block 315, the controller 110 performs an occupant classification, e.g., in a known manner, determines an occupant size, e.g., according to a percentile weight and/or height, etc.

Next, in a block 320, the controller 110 determines a current seat position, e.g., an angle of a back of the seat 12 with respect to the seat bottom 14, a position of the seat 12 on a seat track, etc.

Next, in a block 325, the controller 110 determines a seat belt buckle status, e.g., buckled or unbuckled.

Next, in a block 330, using at least some of the information received and/or determined in the blocks 305-325, the controller 110 determines an articulation of the pads 18, 19. As mentioned above, one or more of the pads 18, 19 may be moved, i.e., articulated, e.g., in a crash event. Further, it is possible that one of the pads 18, 19 may be moved horizontally, vertically, or both, whereas a paired pad 18, 19 may be moved in a different manner, or not at all.

Such movement may be determined by the controller 110 according to various factors, e.g., a vehicle speed, a crash mode (e.g., oblique, frontal, side, etc.), and occupant size (e.g., a percentile of a person's mass, weight, and/or heights compared to the general population), a position of a seat, whether a seatbelt is buckled, position of the occupant in the vehicle (e.g., a seat location), etc.

Next, in a block 335, the controller 110 sends a message to one or more triggering mechanisms 115, 115*a*, 115*b* to trigger passive one or more movement devices 16, 17 and/or one or more horizontal movement devices 20.

Following the block 335, the process 300 ends.

Figure 9:
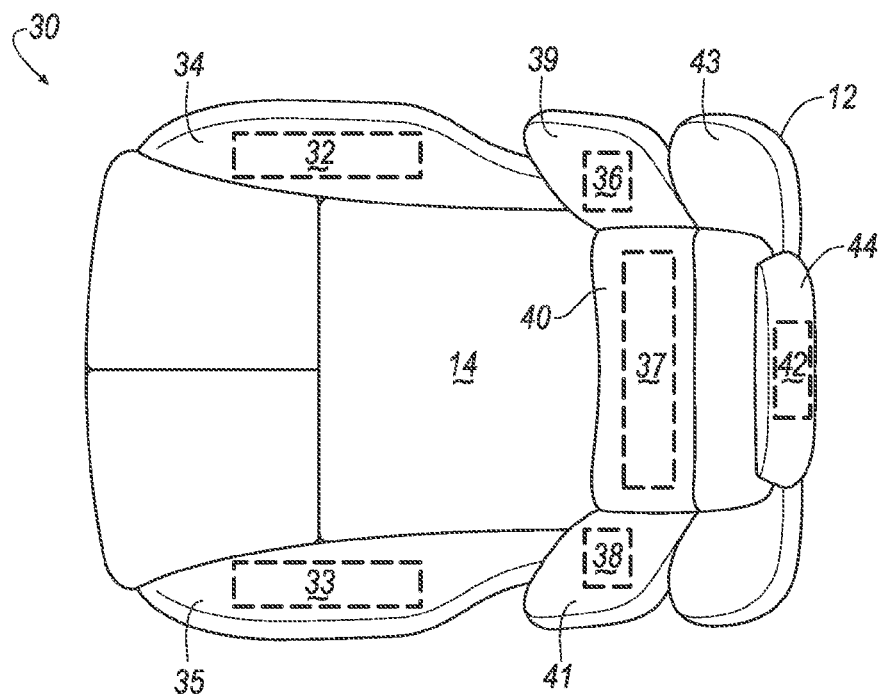
FIG. 9 is a top perspective view of another exemplary articulating support system.
Figure 10:
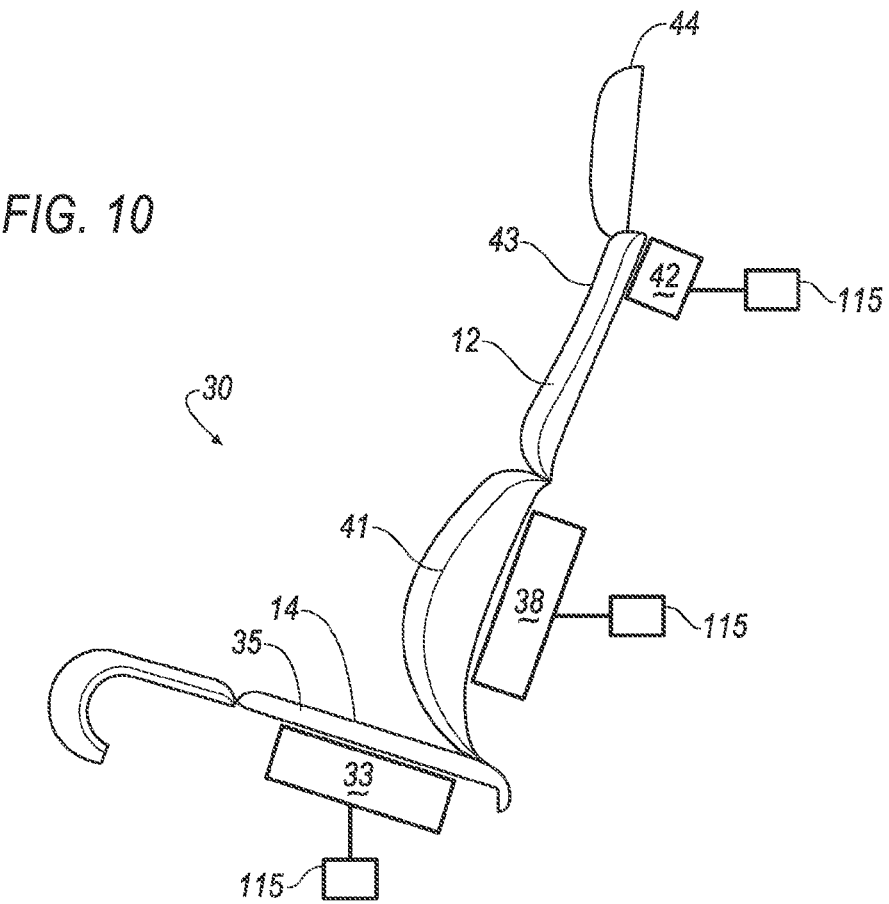
FIG. 10 is a side view of the system of FIG. 9.

FIGS. 9 and 10 illustrate an exemplary articulating support system 30 that can be installed in a vehicle seat 12. The system 30 includes a plurality of articulating seat pads, including a first lower pad 34, a second lower pad 35, a first lumbar pad 39, a central lumbar pad 40, a second lumbar pad 41, an upper pad 43, and a head restraint pad 44. The upper pad 43 may be a substantially U-shaped pad extending a length of the seat 12 between the lumbar pads 39, 40, 41 and the head restraint pad 44. The system 30 further includes a plurality of passive movement devices, including a first lower passive movement device 32, a second lower passive movement device 33, a first lumbar passive movement device 36, a central lumbar passive movement device 37, a second lumbar passive movement device 38, and an upper passive movement device 42. The system 30 may be used to absorb crash energy from the upper portions of the occupant's body, e.g., the head and chest, in frontal and oblique impacts.

The passive movement devices 32, 33, 36, 37, 38, 42 respectively control movement, e.g., articulation, of the articulating seat pads 34, 35, 39, 40, 41, 43, 44. The passive movement devices 32, 33, 36, 37, 38, 42 may include one or more mechanisms, e.g., known components such as a gas-inflatable airbag, an inflatable plastic bladder, or the like. For example, the seat pads 34, 35, 39, 40, 41, 43, 44 may be moved up and down, i.e., substantially vertically, with respect to the seat 12 and a vehicle in which the seat 12 is installed by inflation of the passive movement devices 32, 33, 36, 37, 38, 42. Actuation or deployment of the passive movement devices may be triggered by the triggering mechanism 115, such as is known, e.g., a gas inflator that is pyrotechnically actuated, etc.

The passive movement devices 32, 33, 36, 37, 38, 42 may be actuated independently of one another, and therefore the seat pads 34, 35, 39, 40, 41, 43, 44 may be moved, e.g., articulated, either together or independently of one another. Further, the seat pads 34, 35, 39, 40, 41, 43, 44 may be articulated, e.g., moved vertically, independently of a seat lower portion 46. Note that in the present context "vertically" means that the mechanisms 32, 33, 36, 37, 38, 42 move the pads 34, 35, 39, 40, 41, 43, 44 substantially up and down with respect to the seat lower portion 14. However, just as the portion 14 may deviate somewhat, e.g., by up to approximately ten or twenty degrees, from being perfectly or even substantially horizontal, vertical movement of the pads 34, 35, 39, 40, 41, 43, 44 may likewise deviate from being perfectly or substantially vertical.

Figure 11:
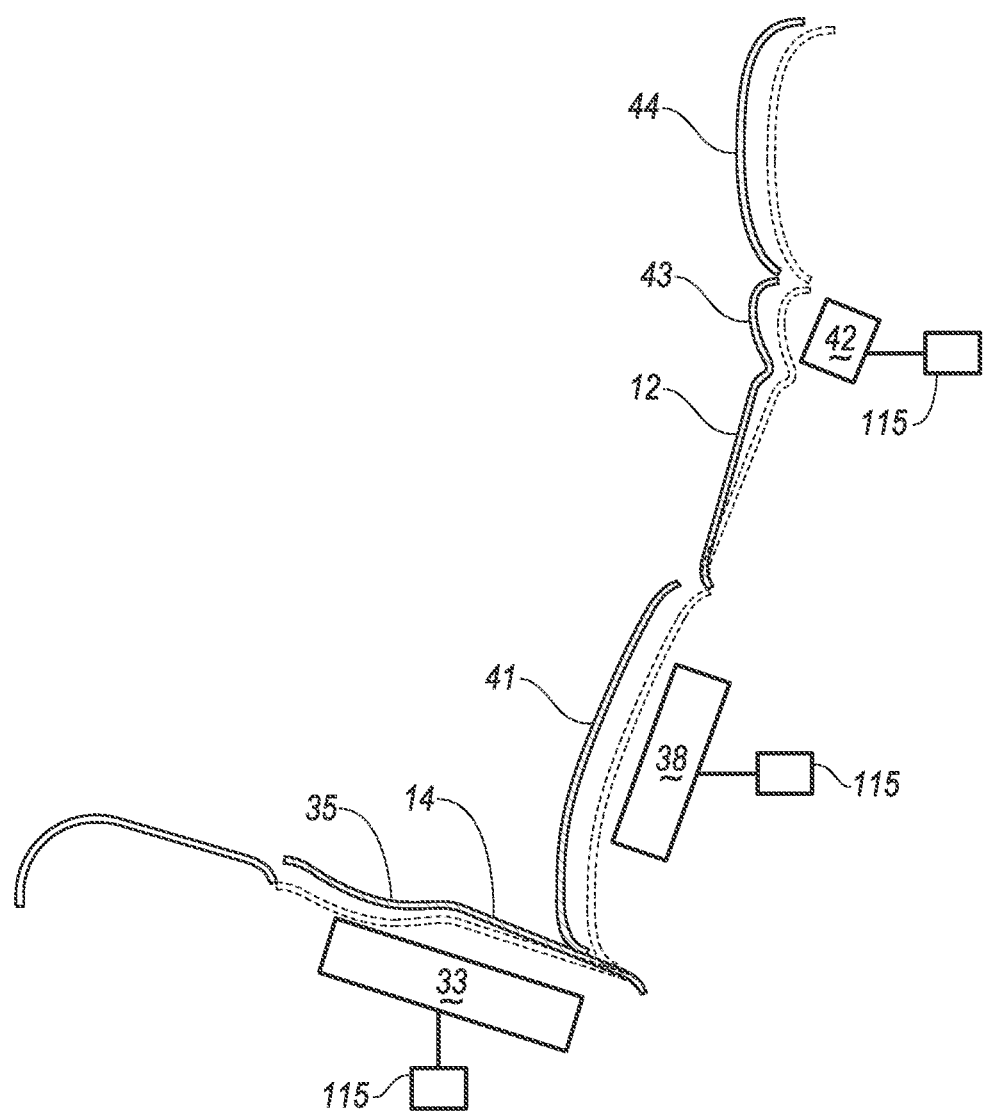
FIG. 11 is a side view of the system of FIG. 9 showing the undeployed state and the deployed state.

FIG. 11 provides an illustration that the seat pads 34, 35, 39, 40, 41, 43, 44 may be moved in an upward direction, from an undeployed state to a deployed state, by deployment of the passive movement devices 32, 33, 36, 37, 38, 42. Further, the seat pads 34, 35, 39, 40, 41, 43, 44 may alternatively be moved in a forward direction, from an undeployed state to a deployed state, by the passive movement devices 32, 33, 36, 37, 38, 42. That is, the seat pads 34, 35, 39, 40, 41, 43, 44 can be restrained in a horizontal direction so that they move vertically upon deployment of the devices 32, 33, 36, 37, 38, 42, or the seat pads 34, 35, 39, 40, 41, 43, 44 can be restrained in a vertical direction so that they move horizontally upon deployment of the devices 32, 33, 36, 37, 38, 42. For example, as shown in FIG. 11, the second lower device 33 may move the second lower pad 35 vertically, the second lumbar device 38 may move the second lumbar pad 41 horizontally, and the upper device 42 may move the upper pad 43 and the head restraint pad 44 horizontally.

Figure 12:
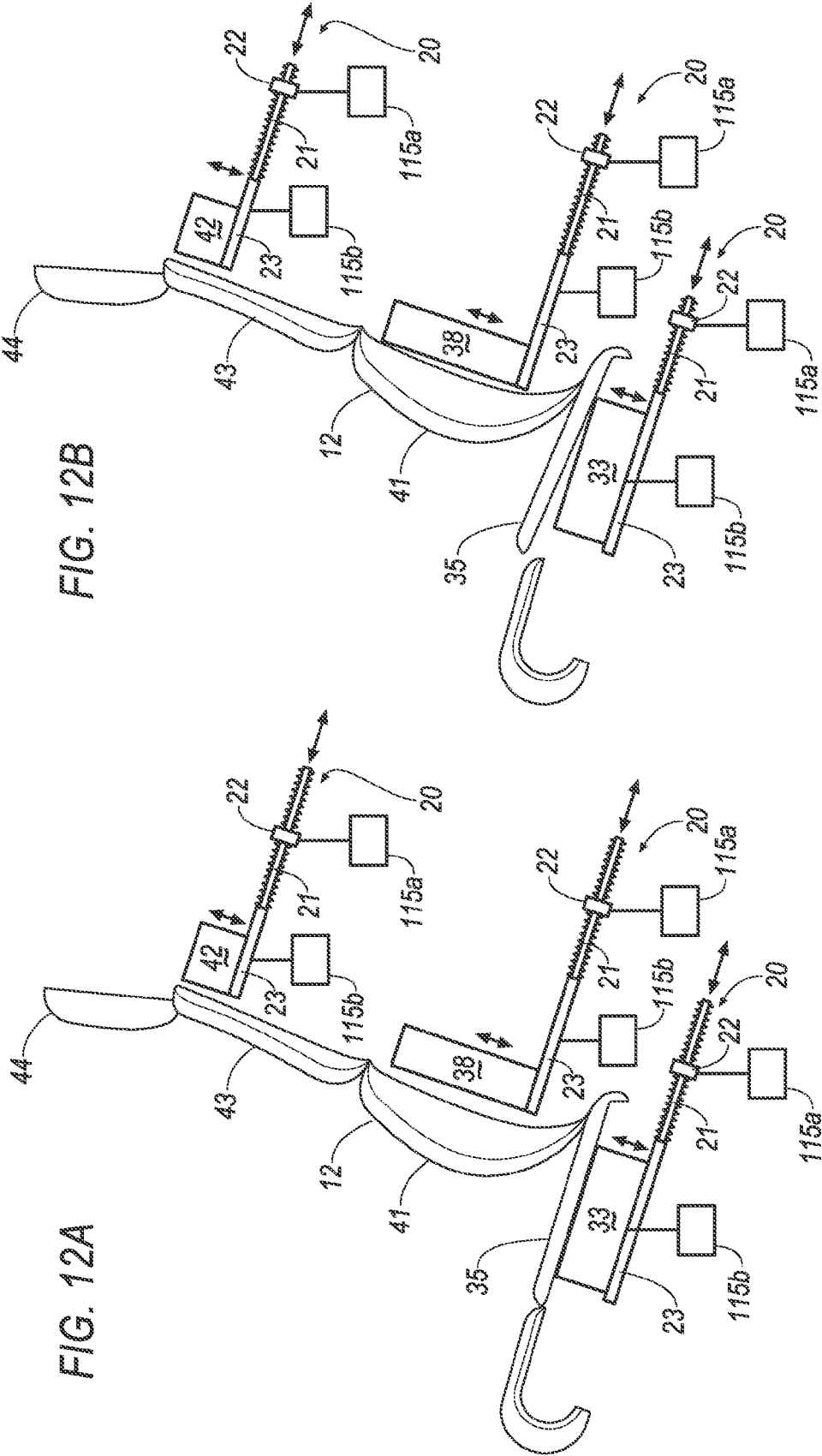
FIGS. 12A and 12B illustrate the system of FIG. 9 including supports that can move horizontally and vertically.

Yet further alternatively or additionally, as illustrated in FIGS. 12A-12B, one or more horizontal movement devices 20 may be arranged, e.g., via the drive mechanism 21, to move seat pads 34, 35, 39, 40, 41, 43, 44 fore and aft, i.e., substantially in a direction along, or parallel to, a longitudinal axis of a vehicle, alternatively or additionally to vertically. That is, one or more devices 20 may be provided as a substitute for, or as a complement to, one or more devices 32, 33, 36, 37, 38, 42.

For example, each of the respective passive movement devices 32, 33, 36, 37, 38, 42 may be used as vertical movement devices, and may be paired with the horizontal movement device 20. For example, the drive mechanism 21, e.g., a piston or worm gear or the like, may be actuated by the stored energy device 22 that in turn is connected to the rigid member 23, e.g., a stiff rod, to moves one of the pads 34, 35, 39, 40, 41, 43, 44. The triggering mechanism 115a may be used to release energy from the stored energy device 22, thereby causing movement of the horizontal drive mechanism 21, causing the member 23 to force one of the seat pads 34, 35, 39, 40, 41, 43, 44 forward. Alternatively or additionally, e.g., possible at substantially the same time, a triggering mechanism or mechanisms 115b may be used to deploy one of the devices 32, 33, 36, 37, 38, 42, deploying one of the seat pads 34, 35, 39, 40, 41, 43, 44 upward.

Figure 13:
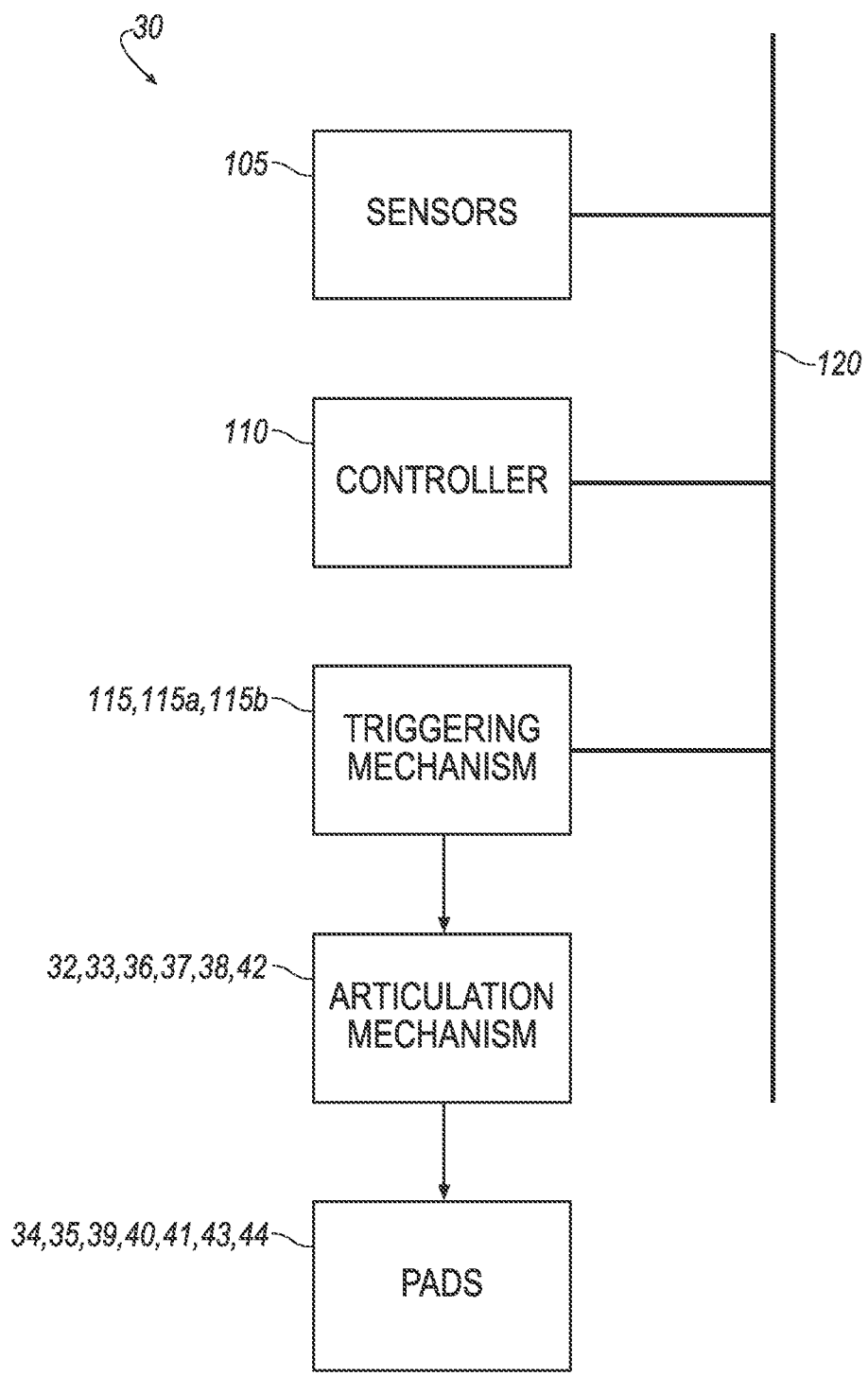
FIG. 13 is a block diagram of the articulating support system of FIG. 9.

FIG. 13 is a block diagram of the exemplary articulating support system 30 of FIG. 9. The system 30 includes elements described above concerning the system 10. Further, in the system 30, the actuating or triggering mechanisms 115, 115a, 115b are associated with passive movement devices 32, 33, 36, 37, 38, 42. The controller 110 may thus send an instruction or instructions to an actuating mechanism 115 as described above, e.g., an inflator of an airbag or bladder included in the passive movement devices 32, 33, 36, 37, 38, 42, and an actuator of the motor 20, etc., to actuate one or more of the passive movement devices 32, 33, 36, 37, 38, 42.

Figure 22:
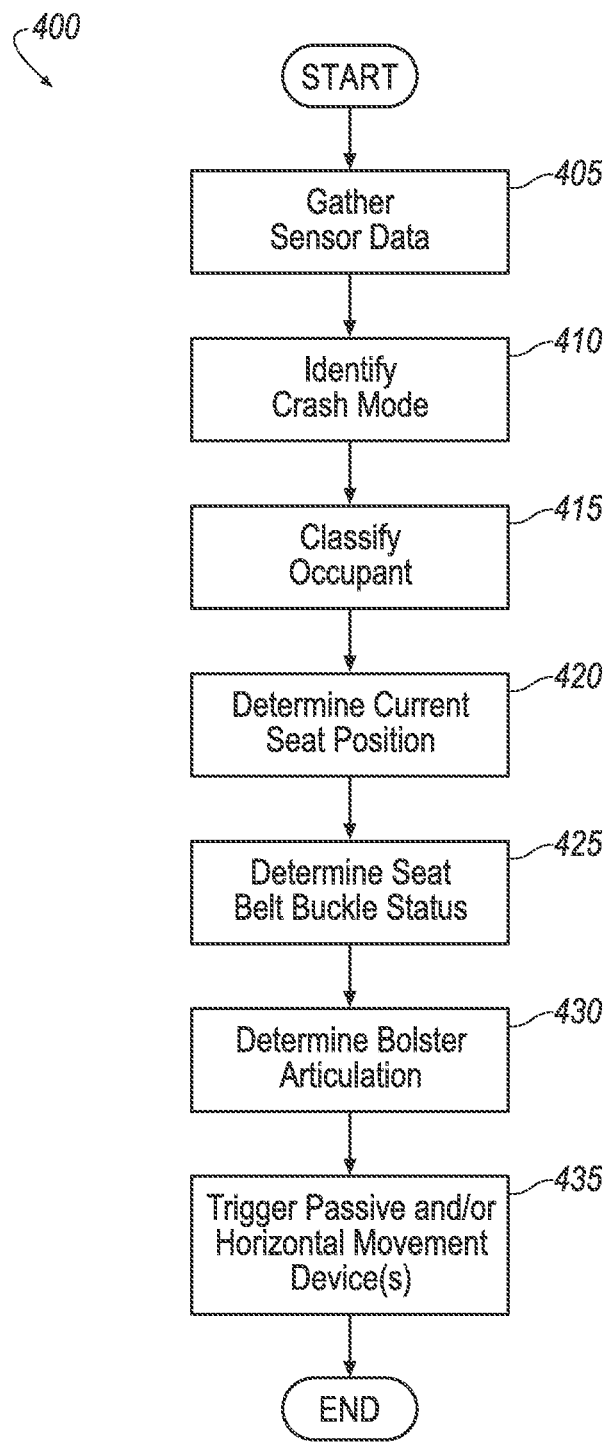
FIG. 22 illustrates an exemplary process flow for the exemplary articulating support system of FIG. 9.

FIG. 22 illustrates an exemplary process 400 that may be executed according to instructions in the controller 110. The process 400 as described herein may be executed for various implementations of the system 30 e.g., including all of the pads 34, 35, 39, 40, 41, 43, 44 or some subset thereof. Before the process 400 begins, one or more of the pads 18, 19, 34, 35, 39, 40, 41, 43, 44 may be in a default, or nominal position. As described herein, various of the pads 18, 19, 34, 35, 39, 40, 41, 43, 44 may be moved forward, backward, up, and/or down with respect to the nominal position, e.g., as described with respect to the process 400.

The process 400 may begin in a block 405, in which the controller 110 receives, e.g., via the bus 120, data from various sensors 105. For example, the controller 110 may receive data from crash sensors such as accelerometers and the like, pre-crash sensors 105 such as radar sensors 105, image sensors 105, etc., as well as occupant sensors 105, e.g., indicating weight, height, age, etc. of one or more vehicle occupants as is known, seat sensors indicating a seat position or positions, seat belt buckle sensors, indicating a status of a seatbelt, e.g., buckled or unbuckled, etc.

Next, in a block 410, generally based on data from crash sensors 105 and/or pre-crash sensors 105, the controller 110 identifies a crash mode, e.g., frontal, oblique, offset, high-speed, low-speed, pedestrian, etc.

Next, in a block 415, the controller 110 performs an occupant classification, e.g., in a known manner, determines an occupant size, e.g., according to a percentile weight and/or height, etc.

Next, in a block 420, the controller 110 determines a current seat position, e.g., an angle of a back of the seat 12 with respect to the seat bottom 14, a position of the seat 12 on a seat track, etc.

Next, in a block 425, the controller 110 determines a seat belt buckle status, e.g., buckled or unbuckled.

Next, in a block 430, using at least some of the information received and/or determined in the blocks 405-425, the controller 110 determines an articulation of the bolsters, i.e., the pads 34, 35, 39, 40, 41, 43, 44. As mentioned above, one or more of the pads 34, 35, 39, 40, 41, 43, 44 may be moved, i.e., articulated, e.g., in a crash event. Further, it is possible that one of the pads 34, 35, 39, 40, 41, 43, 44 may be moved horizontally, vertically, or both, whereas a paired pad 34, 35, 39, 40, 41, 43, 44 may be moved in a different manner, or not at all. Further, it is possible that one of the pads pad 34, 35, 39, 40, 41, 43, 44 may be part of a set including at least two of the other pads 34, 35, 39, 40, 41, 43, 44, each of the pads 34, 35, 39, 40, 41, 43, 44 in the set moving together, in an individual manner, as part of a smaller set, or not at all. For example, the first lumbar pad 39, the central lumbar pad 40, and the second lumbar pad 41 may form a set, and in the crash event, any, all, or none of the pads 39, 40, 41 in the set may be moved horizontally, vertically, or both.

Such movement may be determined by the controller 110 according to various factors, e.g., a vehicle speed, a crash mode (e.g., oblique, frontal, side, etc.), and occupant size (e.g., a percentile of a person's mass, weight, and/or heights compared to the general population), a position of a seat, whether a seatbelt is buckled, position of the occupant in the vehicle (e.g., a seat location), etc.

Next, in a block 435, the controller 110 sends a message to one or more triggering mechanisms 115, 115a, 115b to trigger passive one or more movement devices 32, 33, 36, 37, 38, 42 and/or one or more horizontal movement devices 20.

Following the block 435, the process 400 ends.

Figure 14:
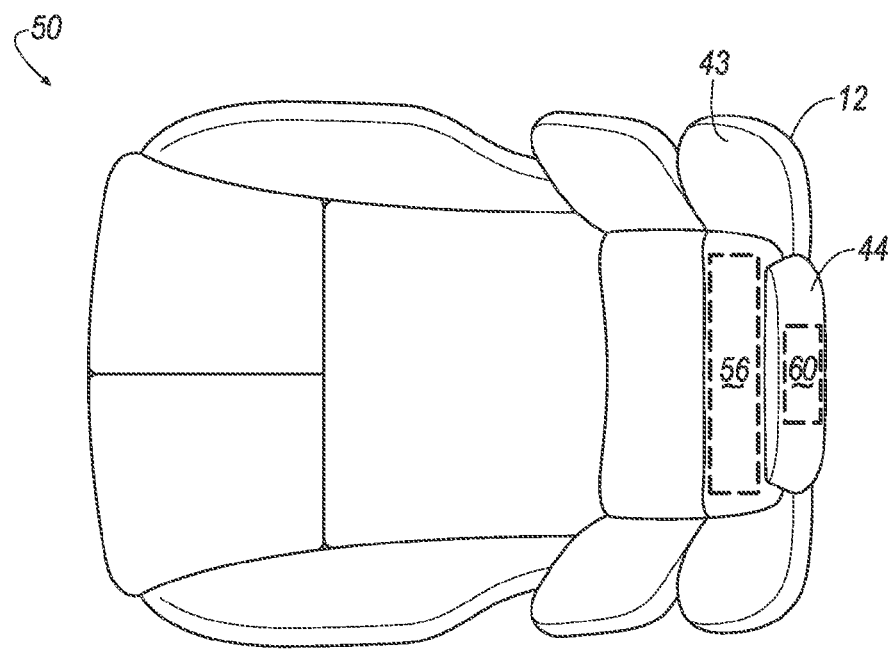
FIG. 14 is a top perspective view of a further exemplary articulating support system.
Figure 15:
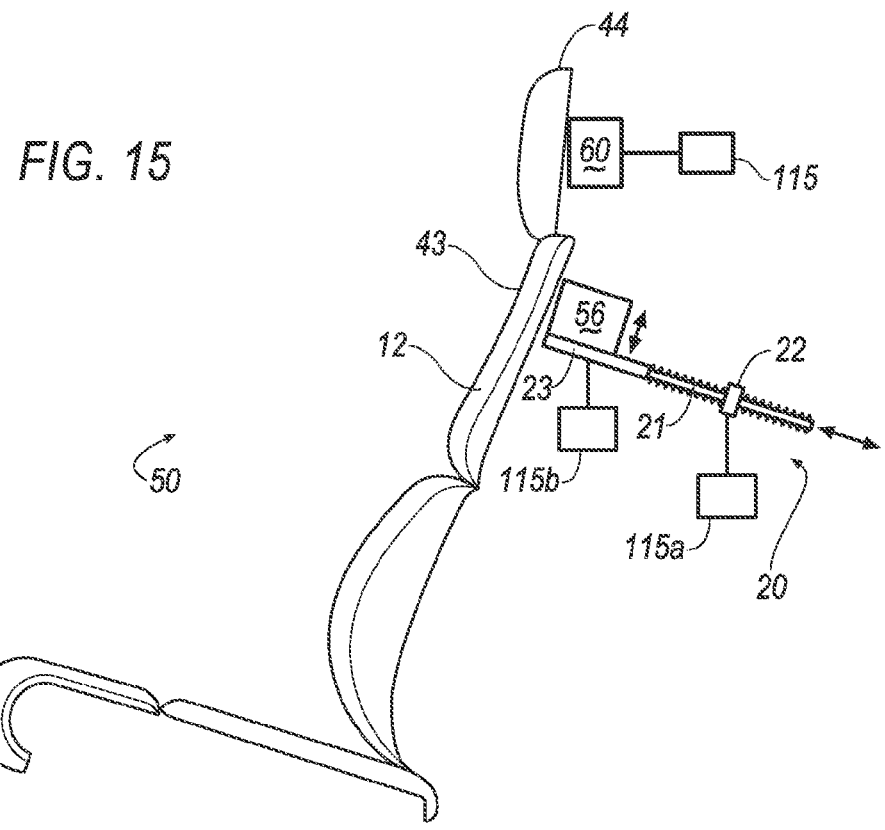
FIG. 15 is a side view of the system of FIG. 14.

FIGS. 14 and 15 illustrate another example of an articulating support system 50 that can be installed into a vehicle seat 12. The system 50 includes a plurality of articulating seat pads, including an upper pad 43 and a head restraint pad 44. The system 30 further includes a plurality of passive movement devices, including an upper passive movement device 56 and a head restraint passive movement device 60. Specifically, the upper passive movement device 56 articulates the upper pad 43, and the head restraint passive movement device 60 articulates the head restraint pad 44. While the upper pad 43 and the head restraint pad 44 may articulate simultaneously or substantially simultaneously, as in the system 30, the upper pad 43 and the head restraint pad 44 in the system 50 may articulate independently. The system 50 may be used to absorb crash energy from the occupant's head and/or neck during a rear impact.

The passive movement devices 56, 60 respectively control movement, e.g., articulation, of the articulating seat pads 43, 44. The passive movement devices 56, 60 may include any of a variety of known components, such as a gas-inflatable airbag, an inflatable plastic bladder, or the like. For example, the seat pads 43, 44 may be moved up and down, i.e., vertically, with respect to the seat 12 and a vehicle in which the seat 12 is installed by inflation of the passive movement devices 56, 60. Actuation or deployment of the passive movement devices may be triggered by the triggering mechanism 115, such as is known, e.g., a gas inflator that is pyrotechnically actuated, etc.

As shown in FIG. 15, the horizontal movement device 20 may be arranged, e.g., via a drive mechanism 21, to move the upper pad 43 fore and aft, i.e., substantially in a direction along, or parallel to, a longitudinal axis of a vehicle, alternatively or additionally to vertically. The triggering mechanism 115a may be used to release energy from the stored energy device 22, thereby causing movement of the horizontal drive mechanism 21, causing the member 23 to deploy the upper pad 43 forward. Alternatively or additionally, e.g., possible at substantially the same time, the triggering mechanism or mechanisms 115b may be used to deploy the upper device 56, deploying the upper pad 43 upward.

Figure 16:
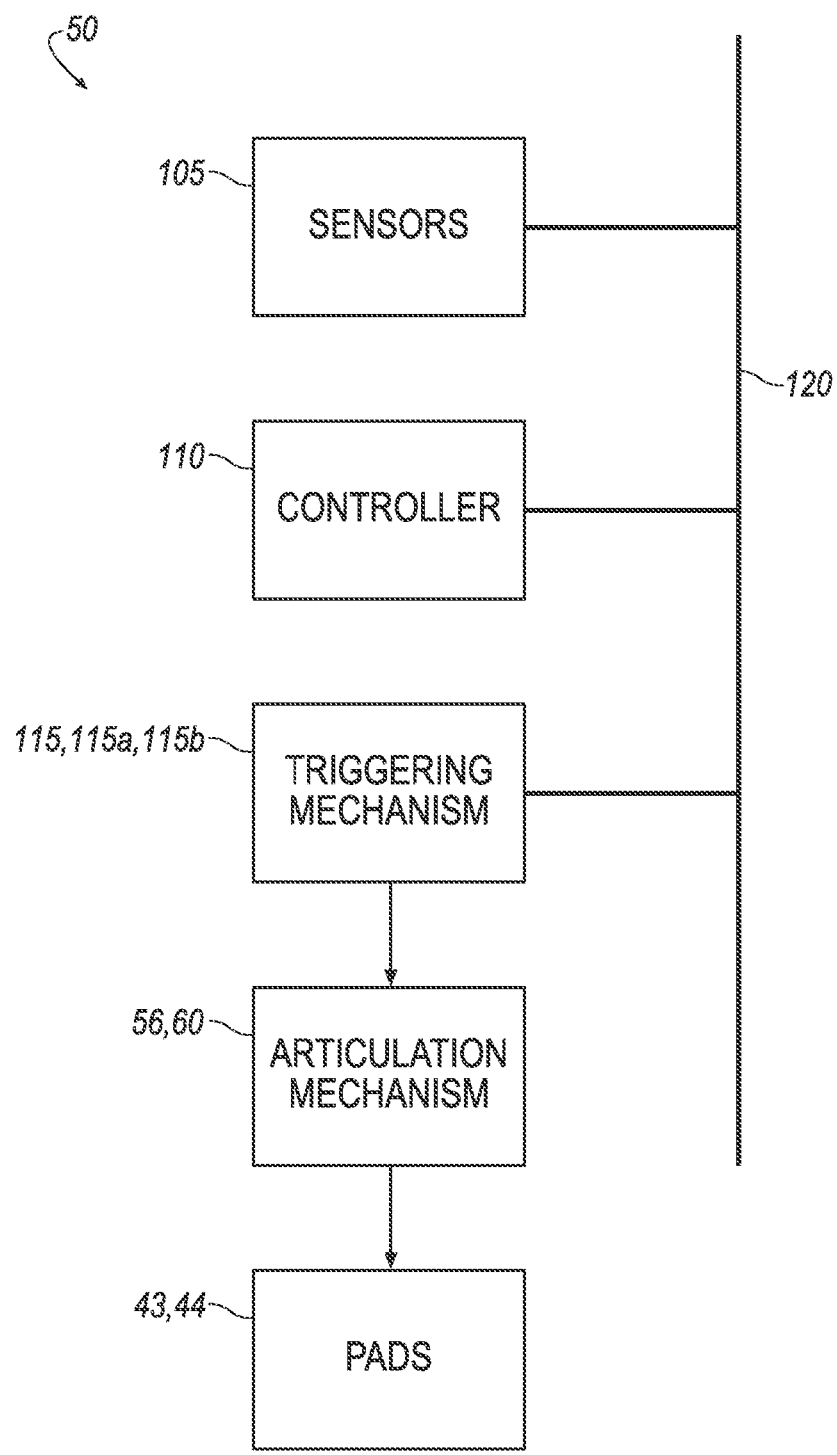
FIG. 16 is a block diagram of the articulating support system of FIG. 14.

FIG. 16 is a block diagram of the exemplary articulating support system 50 of FIG. 14. The system 50 includes elements described above concerning the system 10, as can be seen. The controller 110 may send an instruction to the actuating mechanism 115, e.g., an inflator of an airbag or bladder included in the passive movement devices 56, 60, and an actuator of the motor 20, etc., to actuate one or more passive movement devices 56, 60.

Figure 23:
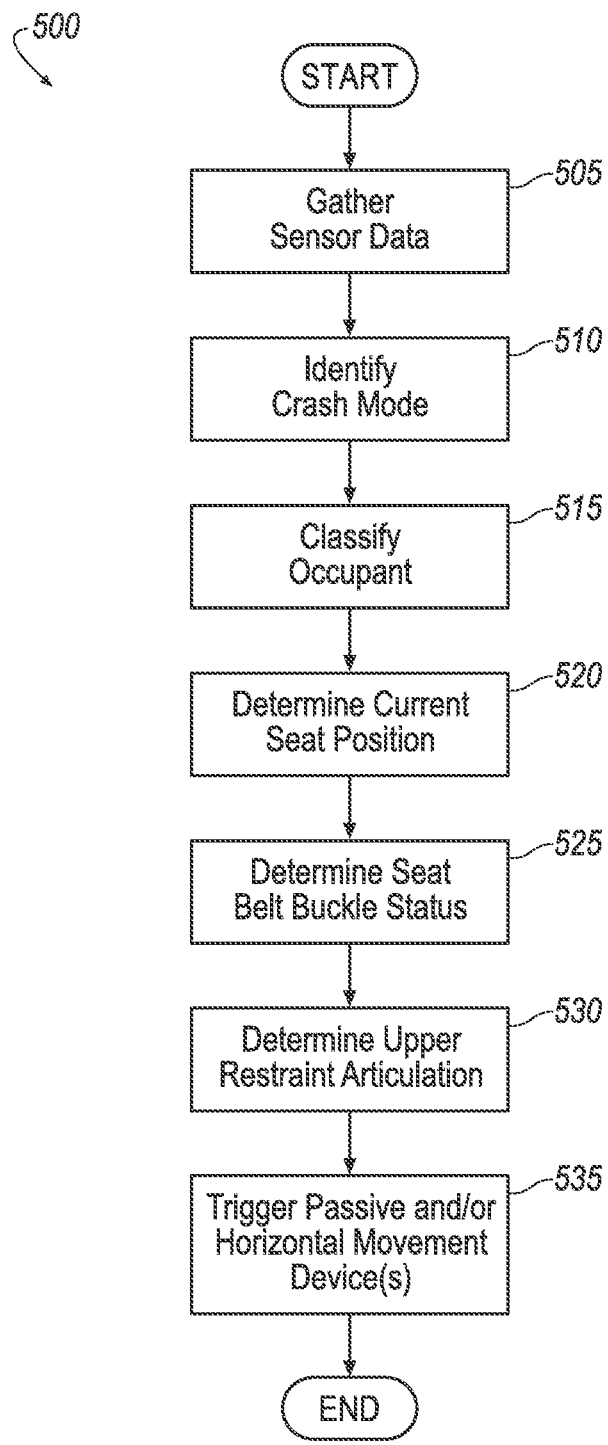
FIG. 23 illustrates an exemplary process flow for the exemplary articulating support system of FIG. 14.

FIG. 23 illustrates an exemplary process 500 that may be executed according to instructions in the controller 110. Before the process 500 begins, one or more of the pads 43, 44 may be in a default, or nominal position. As described herein, various of the pads 43, 44 may be moved forward, backward, up, and/or down with respect to the nominal position, e.g., as described with respect to the process 500.

The process 500 may begin in a block 505, in which the controller 110 receives, e.g., via the bus 120, data from various sensors 105. For example, the controller 110 may receive data from crash sensors 105 such as accelerometers and the like, pre-crash sensors 105 such as radar sensors 105, image sensors 105, etc., as well as occupant sensors 105, e.g., indicating weight, height, age, etc. of one or more vehicle occupants as is known, seat sensors indicating a seat position or positions, seat belt buckle sensors, indicating a status of a seatbelt, e.g., buckled or unbuckled, etc.

Next, in a block 510, generally based on data from crash sensors 105 and/or pre-crash sensors 105, the controller 110 identifies a crash mode, e.g., frontal, oblique, offset, high-speed, low-speed, pedestrian, etc.

Next, in a block 515, the controller 110 performs an occupant classification, e.g., in a known manner, determines an occupant size, e.g., according to a percentile weight and/or height, etc.

Next, in a block 520, the controller 110 determines a current seat position, e.g., an angle of a back of the seat 12 with respect to the seat bottom 14, a position of the seat 12 on a seat track, etc.

Next, in a block 525, the controller 110 determines a seat belt buckle status, e.g., buckled or unbuckled.

Next, in a block 530, using at least some of the information received and/or determined in the blocks 505-525, the controller 110 determines an articulation of the upper restraints, i.e., the pads 43, 44. As mentioned above, one or more of the pads 43, 44 may be moved, i.e., articulated, e.g., in a crash event. Further, it is possible that one of the pads 43, 44 may be moved horizontally, vertically, or both, whereas a paired pad 43, 44 may be moved in a different manner, or not at all.

Such movement may be determined by the controller 110 according to various factors, e.g., a vehicle speed, a crash mode (e.g., oblique, frontal, side, etc.), and occupant size (e.g., a percentile of a person's mass, weight, and/or heights compared to the general population), a position of a seat, whether a seatbelt is buckled, position of the occupant in the vehicle (e.g., a seat location), etc.

Next, in a block 535, the controller 110 sends a message to one or more triggering mechanisms 115, 115a, 115b to trigger passive one or more movement devices 56, 60 and/or one or more horizontal movement devices 20.

Following the block 535, the process 500 ends.

Figure 17:
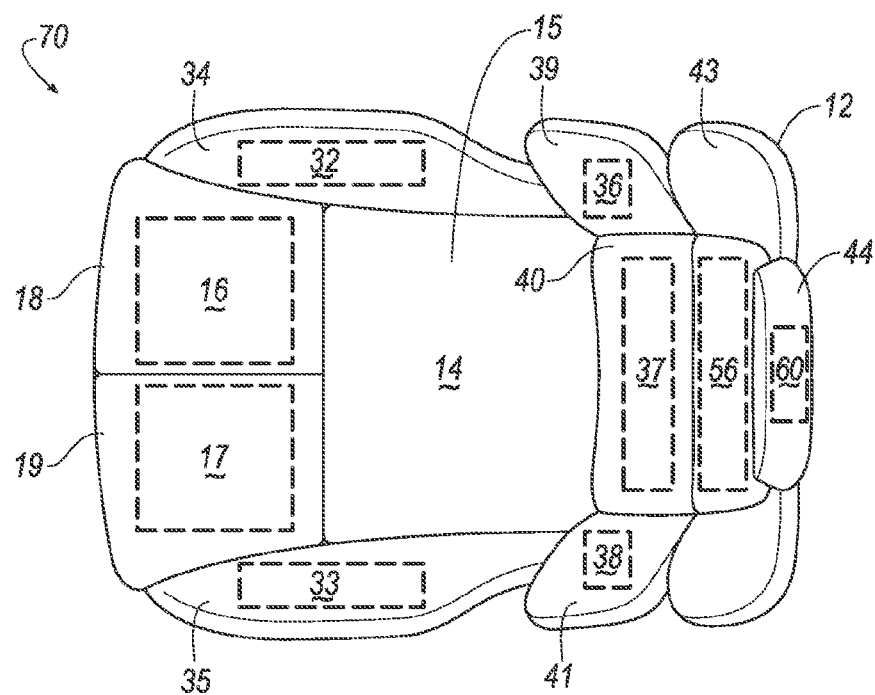
FIG. 17 is a top perspective view of a third exemplary articulating support system.
Figure 18:
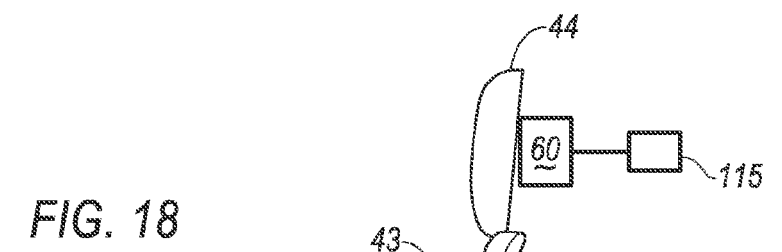
FIG. 18 is a side view of the system of FIG. 17.

FIGS. 17 and 18 illustrate another example of an articulating support system 70 that can be installed into a vehicle seat 12. The system 70 includes a plurality of articulating seat pads, including the first thigh pad 18, the second thigh pad 19, the first lower pad 34, the second lower pad 35, the first lumbar pad 39, the central lumbar pad 40, the second lumbar pad 41, the upper pad 43, and the head restraint pad 44. The system 70 further includes a plurality of passive movement devices, including the first thigh passive movement device 16, the second thigh passive movement device 17, the first lower passive movement device 32, the second lower passive movement device 33, the first lumbar passive movement device 36, the central lumbar passive movement device 37, the second lumbar passive movement device 38, the upper passive movement device 56, and the head restraint passive movement device 60. Each of the articulating seat pads 18, 19, 34, 35, 39, 40, 41, 43, 44 may be paired with a respective passive movement device 16, 17, 32, 33, 36, 37, 38, 56, 60 similarly to the system 10, 30, 50. The passive movement devices 16, 17, 32, 33, 36, 37, 38, 56, 60 may be arranged behind the respective articulating seat pads 18, 19, 34, 35, 39, 40, 41, 43, 44. In this context, "behind" mean that a device 16, 17, 32, 33, 36, 37, 38, 56, 60 is positioned vertically or horizontally within the seat 12 such that the seat pads 18, 19, 34, 35, 39, 40, 41, 43, 44 face into the vehicle such that a user may contact, e.g., the seat pad 18, 19, 34, 35, 39, 40, 41, 43, 44 (or possibly a covering thereof), and the device 16, 17, 32, 33, 36, 37, 38, 56, 60 is vertically below or beneath and/or horizontally behind, i.e., with respect to a longitudinal axis of the vehicle, a respective pad 18, 19, 34, 35, 39, 40, 41, 43, 44, and generally positioned to move the pad 18, 19, 34, 35, 39, 40, 41, 43, 44 as described herein. The system 70 may absorb crash energy from several parts of the occupants' body, e.g. the legs and the chest, during several types of impacts, e.g. oblique impacts and rear impacts.

The passive movement devices 16, 17, 32, 33, 36, 37, 38, 42, 56, 60 respectively control movement, e.g., articulation, of the articulating seat pads. The passive movement devices 16, 17, 32, 33, 36, 37, 38, 42, 56, 60 may include any of a variety of known components, such as a gas-inflatable airbag, an inflatable plastic bladder, or the like. For example, the seat pads may be moved up and down, i.e., vertically, with respect to the seat 12 and a vehicle in which the seat 12 is installed by inflation of the passive movement devices 16, 17, 32, 33, 36, 37, 38, 42, 56, 60. Actuation or deployment of the passive movement devices 16, 17, 32, 33, 36, 37, 38, 42, 56, 60 may be triggered by the triggering mechanism 115 such as is known, e.g., a gas inflator that is pyrotechnically actuated, etc.

The passive movement devices 18, 19, 34, 35, 39, 40, 41, 43, 44 may be actuated independently of one another, and therefore the seat pads 18, 19, 34, 35, 39, 40, 41, 43, 44 may be moved, e.g., articulated, either together or independently of one another. For example, the first thigh pad 18 and the second thigh pad 19 may be articulated together simultaneously or substantially simultaneously as a set. In the crash event, any, all, or none of the pads 18, 19 in the set may be moved horizontally, vertically, or both. Any or all of the pads 18, 19, 34, 35, 39, 40, 41, 43, 44 may be included in the set.

Further, the seat pads 18, 19, 34, 35, 39, 40, 41, 43, 44 may be articulated, e.g., moved vertically, independently of a seat lower portion 14. Note that in the present context "vertically" means that the mechanisms move the pads generally up and down with respect to the seat lower portion. However, just as the portion may deviate somewhat, e.g., by up to approximately ten or twenty degrees, from being perfectly horizontal, vertical movement of the pads 18, 19, 34, 35, 39, 40, 41, 43, 44 may likewise deviate from being perfectly vertical. Each of the passive movement devices 16, 17, 32, 33, 36, 37, 38, 42, 56, 60 may be used as vertical movement devices, and may be paired with a horizontal movement device 20, as described above.

Figure 19:
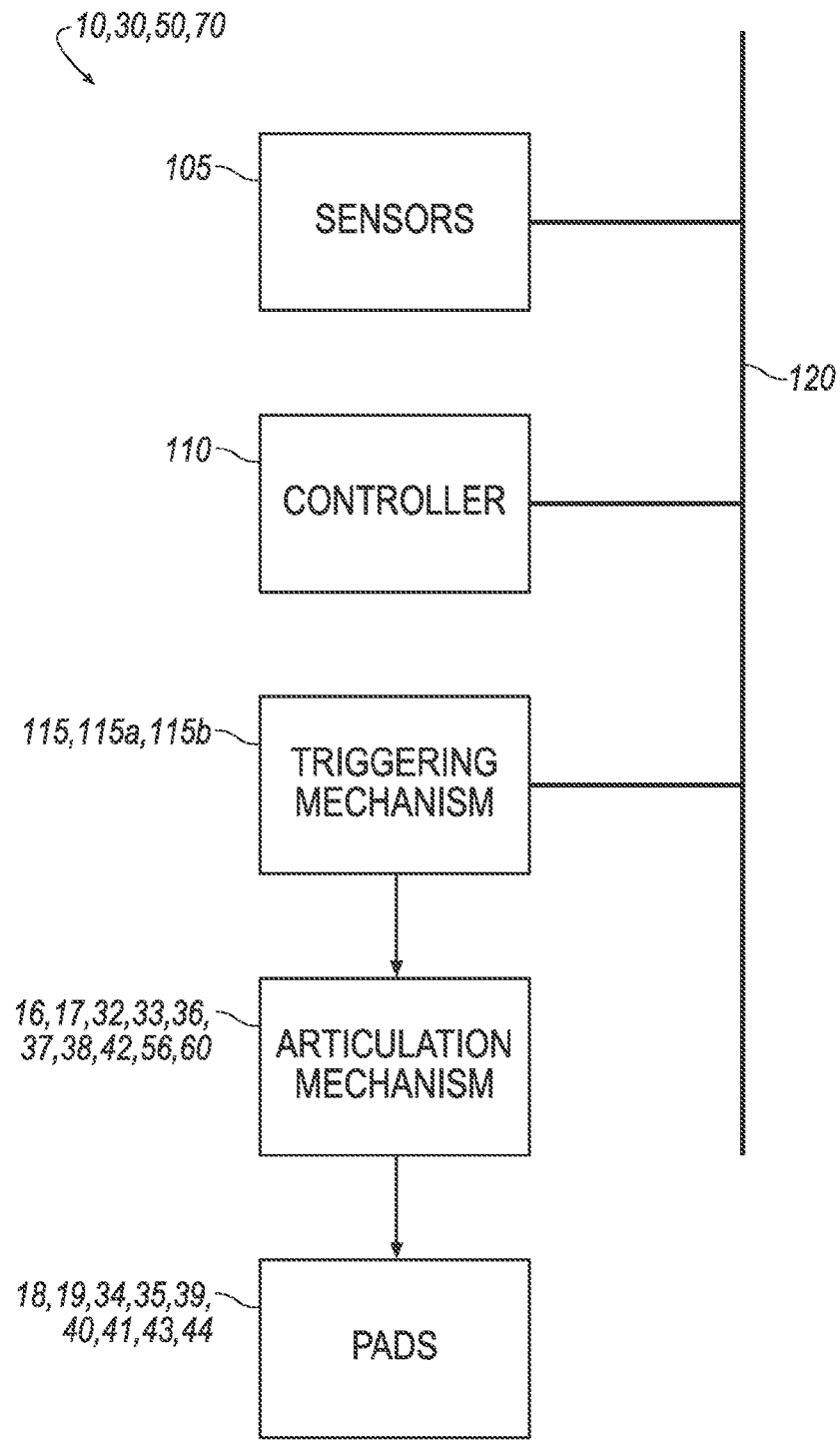
FIG. 19 is a block diagram of the articulating support system of FIG. 17.

FIG. 19 is a block diagram of the exemplary articulating support system 10, 30, 50, 70. The system 70 includes elements described above concerning the system 10, as can be seen. The controller 110 may send an instruction to the actuating mechanism 115, 115a, 115b, e.g., an inflator of an airbag or bladder included in the passive movement devices, and an actuator of a motor 20, etc., to actuate one or more of the passive movement devices 16, 17, 32, 33, 36, 37, 38, 42, 56, 60.

Figure 20:
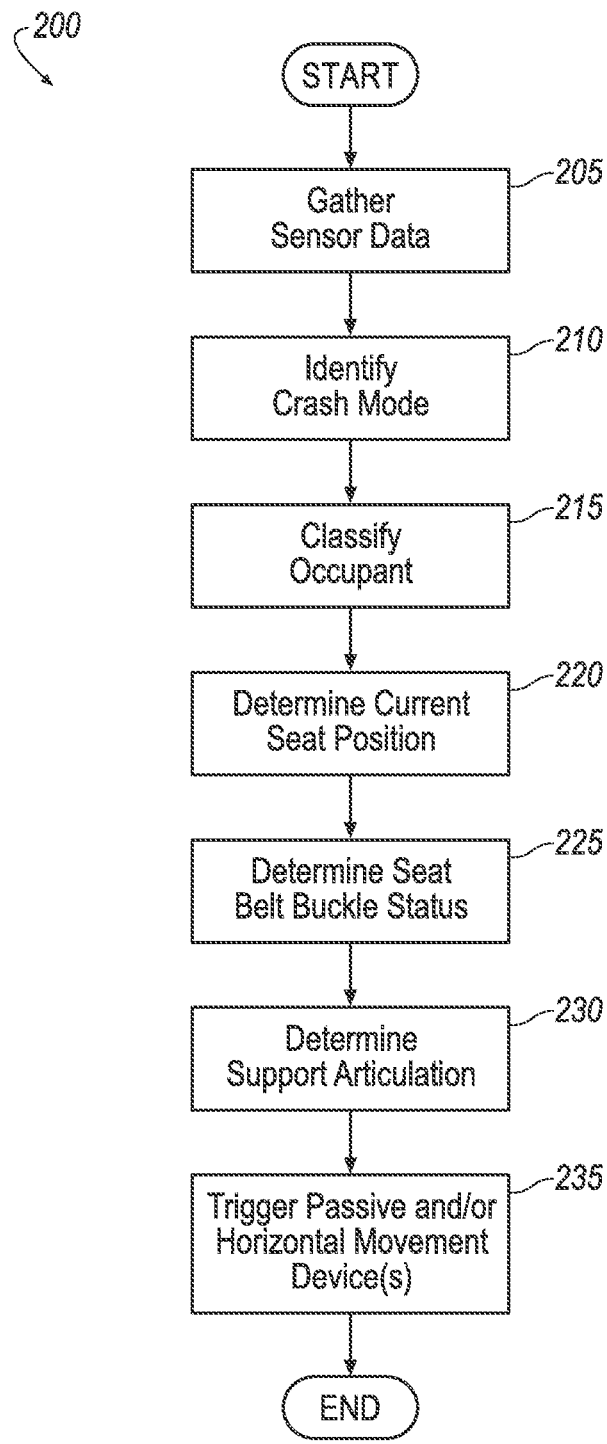
FIG. 20 illustrates an exemplary process flow for the exemplary articulating support systems of FIGS. 1, 9, 14, and 17.

FIG. 20 illustrates an exemplary process 200 that may be executed according to instructions in the controller 110. The process 200 as described herein may be executed for various implementations of the system 10, 30, 50, 70, e.g., including all of the pads 18, 19, 34, 35, 39, 40, 41, 43, 44 or some subset thereof, e.g., including only thigh support pads 18 and 19 and/or one or more other pairs of pads 34, 35, 39, 40, 41, 43, 44. Before the process 200 begins, one or more of the pads 18, 19, 34, 35, 39, 40, 41, 43, 44 may be in a default, or nominal position. As described herein, various of the pads 18, 19, 34, 35, 39, 40, 41, 43, 44 may be moved forward, backward, up, and/or down with respect to the nominal position, e.g., as described with respect to the process 200.

The process 200 may begin in a block 205, in which the controller 110 receives, e.g., via the bus 120, data from various sensors. For example, the controller 110 may receive data from crash sensors such as accelerometers and the like, pre-crash sensors such as radar sensors, image sensors, etc., as well as occupant sensors, e.g., indicating weight, height, age, etc. of one or more vehicle occupants as is known, seat sensors indicating a seat position or positions, seat belt buckle sensors, indicating a status of a seatbelt, e.g., buckled or unbuckled, etc.

Next, in a block 210, generally based on data from crash sensors and/or pre-crash sensors, the controller 110 identifies a crash mode, e.g., frontal, oblique, offset, high-speed, low-speed, pedestrian, etc.

Next, in a block 215, the controller 110 performs an occupant classification, e.g., in a known manner, determines an occupant size, e.g., according to a percentile weight and/or height, etc.

Next, in a block 220, the controller 110 determines a current seat position, e.g., an angle of a back of the seat 12 with respect to the seat bottom 14, a position of the seat 12 on a seat track, etc.

Next, in a block 225, the controller 110 determines a seat belt buckle status, e.g., buckled or unbuckled.

Next, in a block 230, using at least some of the information received and/or determined in the blocks 205-225, the controller 110 determines an articulation of the pads 18, 19, 34, 35, 39, 40, 41, 43, 44. As mentioned above, one or more of the pads 18, 19, 34, 35, 39, 40, 41, 43, 44 may be moved, i.e., articulated, e.g., in a crash event. Further, it is possible that one of the pads 18, 19, 34, 35, 39, 40, 41, 43, 44 may be moved horizontally, vertically, or both, whereas a paired pad 18, 19, 34, 35, 39, 40, 41, 43, 44 may be moved in a different manner, or not at all. Further, it is possible that one of the pads pad 18, 19, 34, 35, 39, 40, 41, 43, 44 may be part of a set including at least two of the other pads 18, 19, 34, 35, 39, 40, 41, 43, 44, each of the pads 18, 19, 34, 35, 39, 40, 41, 43, 44 in the set moving together, in an individual manner, as part of a smaller set, or not at all. For example, the first lumbar pad 39, the central lumbar pad 40, and the second lumbar pad 41 may form a set, and in the crash event, any, all, or none of the pads 39, 40, 41 in the set may be moved horizontally, vertically, or both.

Such movement may be determined by the controller 110 according to various factors, e.g., a vehicle speed, a crash mode (e.g., oblique, frontal, side, etc.), and occupant size (e.g., a percentile of a person's mass, weight, and/or heights compared to the general population), a position of a seat, whether a seatbelt is buckled, position of the occupant in the vehicle (e.g., a seat location), etc. For example articulation of some or all of the pads 18, 19, 34, 35, 39, 40, 41, 43, 44, e.g., as part of one or more of the systems 10, 30, 50, and 70, could be determined as described in Table 1 below:

TABLE 1

| Pass. Size | Pass. Gender | Seat Pos. | Belted? | Seat Loc. | Crash Mode | Vehicle Speed |
|---|---|---|---|---|---|---|
| $50^{th}$ | Male | mid-track | Yes | Driver | Left-side oblique | 30 mph |
| $5^{th}$ | Female | mid-track | No | Passenger | Full frontal | 30 mph |
| $95^{th}$ | Male | full rear track | Yes | Driver | Offset | 25 mph |

TABLE 1-continued

| | | | | | | | | Head Restraint linear Position (Pad 42) | Head Restraint Angular Position (Pad 42) |
|---|---|---|---|---|---|---|---|---|---|
| 5th | Female | full forward track | Yes | Driver | Full frontal | | | 35 mph | |
| 5th | Female | Full Forward | Yes | Driver | Rear Impact | | | 25 mph | |

| Left Pad Pos. | Right Pad Pos. | Upper Left Bolster (Pad 36) | Upper Right Bolster (Pad 38) | Lower Left Bolster (Pad 32) | Lower Right Bolster (Pad 33) | Center Bolster (Pad 37) | Head Restraint linear Position (Pad 42) | Head Restraint Angular Position (Pad 42) |
|---|---|---|---|---|---|---|---|---|
| Down | Nominal | Inboard | Inboard | Outboard | Outboard | Nominal | Nominal | Nominal |
| Up | Up | Inboard | Inboard | Inboard | Inboard | Full Extension | Nominal | Nominal |
| Nominal | Nominal | Outboard | Outboard | Outboard | Outboard | Full Retraction | Full Retraction | Nominal |
| Up | Nominal | Inboard | Inboard | Inboard | Inboard | Full Extension | Full Extension | Nominal |
| Nominal | Nominal | Nominal | Outboard | Outboard | Outboard | Full Extension | Full Extension | 45 degree rotation |

Next, in a block 235, the controller 110 sends a message to one or more triggering mechanisms 115, 115a, 115b to trigger passive one or more movement devices 16, 17, 32, 33, 36, 37, 38, 42, 56, 60 and/or one or more horizontal movement devices 20.

Following the block 235, the process 200 ends. It is to be understood that certain steps of the process 200 could be omitted, and/or steps of the process 200 could be executed in a different order than described herein.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a plurality of pads configured to be arranged on a vehicle seat;
a plurality of passive movement devices respectively arranged behind, and to cause movement of, the pads;
wherein the passive movement devices are configured to be actuated independently of one another and each one of the plurality of pads is configured to move independently of one another upon actuation of the passive movement devices.

2. The system of claim 1, further comprising a controller that includes a processor and a memory, the memory storing instructions executable by the processor to actuate at least one of the passive movement devices.

3. The system of claim 2, wherein the memory further stores instructions executable by the processor to receive data from at least one impact sensor, and to use the received data in determining to actuate at least one of the passive movement devices.

4. The system of claim 3, wherein the memory further stores instructions executable by the processor to actuate only one of the passive movement devices based on the received data.

5. The system of claim 1, wherein the passive movement devices include one of an airbag, a plastic bladder, and a motor.

6. The system of claim 1, wherein the passive movement devices are arranged to move the pads vertically, the system further comprising at least one horizontal movement device, wherein each at least one horizontal movement device is arranged to move a respective one of the pads horizontally.

7. The system of claim 6, wherein each at least one horizontal movement device includes a stored energy device that is arranged to release a horizontal movement mechanism.

8. The system of claim 7, further comprising a controller that includes a processor and a memory, the memory storing instructions executable by the processor to actuate at least one of the passive movement devices and the stored energy device.

9. The system of claim 1, wherein the seat includes a lower seat portion, a lumbar seat portion, an upper seat portion, and a head restraint.

10. The system of claim 9, wherein the lower seat portion includes a first pad, a second pad, a first passive movement device arranged behind the first pad, and a second passive movement device arranged behind the second pad.

11. The system of claim 9, wherein the lumbar seat portion includes a first pad, a second pad, a central pad, a first passive movement device arranged behind the first pad, a second passive movement device arranged behind the second pad, and a central passive movement device arranged behind the central pad.

12. The system of claim 9, wherein the upper seat portion includes an upper pad, the head restraint includes a head restraint pad, and an upper seat passive movement device is arranged behind the upper pad.

13. A method, comprising:
   using data relating to an impact to determine to actuate at least one of a plurality of passive movement devices that are respectively arranged behind, and to cause movement of, a plurality of pads in a vehicle seat; wherein the passive movement devices are configured to be actuated independently of one another and each one of the plurality of pads is configured to move independently of one another upon actuation of the passive movement devices.

14. The method of claim 13, further comprising actuating the plurality of passive movement devices based on the received data.

15. The method of claim 13, wherein the passive movement devices are arranged to move the pads vertically, the method further comprising, based on the data relating to the impact, moving at least one horizontal movement device that is arranged to move a respective one of the pads horizontally.

16. The method of claim 15, wherein each at least one horizontal movement device includes a stored energy device that is arranged to release a horizontal movement mechanism, the method further comprising actuating at least one of the passive movement devices and the stored energy device.

17. A controller that includes a processor and a memory, the memory storing instructions executable by the processor, including instructions to:
   use data relating to an impact to determine to actuate at least one of a plurality of passive movement devices that are arranged behind, and to cause movement of, a plurality of pads in a vehicle seat; wherein the passive movement devices are configured to be actuated independently of one another and each one of the plurality of pads is configured to move independently of one another upon actuation of the passive movement devices.

18. The controller of claim 17, the instructions further including instructions to actuate the passive movement devices based on the received data.

19. The controller of claim 17, wherein the passive movement devices are arranged to move the pads vertically, the instructions further including instructions to, based on the data relating to the impact, move at least one horizontal movement device that is arranged to move a respective one of the pads horizontally.

20. The controller of claim 19, wherein each at least one horizontal movement device includes a stored energy device that is arranged to release a horizontal movement mechanism, the instructions further including instructions to actuate at least one of the passive movement devices and the stored energy device.

* * * * *